UNITED STATES PATENT OFFICE.

CARL BOSCH AND WILHELM WILD, OF LUDWIGSHAFEN-ON-THE-RHINE, GERMANY, ASSIGNORS TO BADISCHE ANILIN & SODA FABRIK, OF LUDWIGSHAFEN-ON-THE-RHINE, GERMANY, A CORPORATION.

PROCESS OF PURIFYING HYDROGEN GAS.

1,126,371.  Specification of Letters Patent.  Patented Jan. 26, 1915.

No Drawing.  Application filed January 30, 1912.  Serial No. 674,416.

*To all whom it may concern:*

Be it known that we, CARL BOSCH and WILHELM WILD, subjects, respectively, of the King of Prussia and the Grand Duke of Baden, residing at Ludwigshafen-on-the-Rhine, Germany, have invented new and useful Improvements in the Process of Purifying Hydrogen Gas, of which the following is a specification.

When, in the production of hydrogen, coal or other carbonaceous material is employed either directly or indirectly, the hydrogen obtained always contains carbon monoxid. As instances of such methods of producing hydrogen, we mention passing steam over highly heated coal or coke, also soaking coal in alkaline solution and then heating the mixture with steam at comparatively low temperatures, further heating coal with water under pressure, and also passing hydrocarbons with steam over nickel at a temperature of say 1000° C. If considerable quantities of carbon monoxide are present, the greater part can be removed, either by liquefaction or by passing the gases over caustic lime, but some carbon monoxid always remains, so that the hydrogen cannot be used for some purposes and is considerably less advantageous in use than pure hydrogen, such as is produced, for instance, by electrolysis. We have now found that we can, on a technical scale, completely abstract carbon monoxid from hydrogen gas containing it by heating the gas mixture with a solution of caustic alkali under pressure exceeding that of five atmospheres. We prefer to employ fairly high temperatures, for instance from 200° C. to 270° C., and the caustic alkali solution can be renewed either periodically or continuously. It was known that a caustic alkali solution is capable of combining with carbon monoxid, but no process has hitherto been known for completely removing the smallest quantities of carbon monoxid, and this is not possible when employing other reagents hitherto in use for the absorption of carbon monoxid, such for instance as caustic lime and cuprous chlorid, even when the latter is employed under pressure as described in German Patent No. 35,229.

The process of this invention is of particular importance in connection with the catalytic production of ammonia from its elements under pressure, since the presence of even small quantities of carbon monoxid is often deleterious.

The pressure under which the process of the present invention can be carried out may vary very considerably and in some cases it is advantageous to employ high pressure, for instance, from 140 to 200 atmospheres or even higher, since then the gases can be passed with much greater rapidity through the caustic alkali solution and yet a complete absorption of the carbon monoxid obtained.

The following examples will serve to illustrate further the nature of our invention, which, however, is not confined to these examples.

Example 1: Wash hydrogen containing about one per cent. of carbon monoxid, under a pressure of 50 atmospheres and at a temperature of 260° C., with an 80% solution of caustic soda.

Example 2: Wash hydrogen containing about one per cent. of carbon monoxid, under a pressure of 200 atmospheres and at a temperature of 240° C., with a 25% solution of caustic soda. In a similar manner hydrogen containing carbon monoxid can be treated with solutions containing less than 25% of caustic soda, for instance from 5% upward.

We claim:—

1. The process of producing pure hydrogen consisting in heating hydrogen containing small quantities of carbon monoxid under a pressure exceeding five atmospheres with a solution of caustic alkali.

2. The process of producing pure hydrogen consisting in heating hydrogen containing small quantities of carbon monoxid at a pressure of 140 to 200 atmospheres and at a temperature of from 230° to 260° C., with a 5 to 25 per cent. solution of caustic soda.

In testimony whereof we have hereunto set our hands in the presence of two subscribing witnesses.

CARL BOSCH.
WILHELM WILD.

Witnesses:
A. O. TITTMANN,
J. ALEC. LLOYD.

Copies of this patent may be obtained for five cents each, by addressing the "Commissioner of Patents, Washington, D. C."